(12) United States Patent
Lee et al.

(10) Patent No.: US 10,475,441 B2
(45) Date of Patent: Nov. 12, 2019

(54) VOICE END-POINT DETECTION DEVICE, SYSTEM AND METHOD

(71) Applicants: Hyundai Motor Company, Seoul (KR); Kia Motors Corporation, Seoul (KR)

(72) Inventors: Kyung Chul Lee, Gyeonggi-do (KR); Jae Min Joh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/810,838

(22) Filed: Nov. 13, 2017

(65) Prior Publication Data

US 2018/0357999 A1 Dec. 13, 2018

(30) Foreign Application Priority Data

Jun. 7, 2017 (KR) ........................ 10-2017-0070895

(51) Int. Cl.
| | |
|---|---|
| *G10L 15/05* | (2013.01) |
| *G10L 25/51* | (2013.01) |
| *G10L 15/22* | (2006.01) |
| *G10L 25/78* | (2013.01) |
| *G10L 17/02* | (2013.01) |
| *G10L 17/00* | (2013.01) |

(52) U.S. Cl.
CPC .............. *G10L 15/05* (2013.01); *G10L 15/22* (2013.01); *G10L 17/005* (2013.01); *G10L 17/02* (2013.01); *G10L 25/51* (2013.01); *G10L 25/78* (2013.01)

(58) Field of Classification Search
CPC .......... G10L 25/78; G10L 25/84; G10L 25/87
See application file for complete search history.

(56) References Cited

U.S. PATENT DOCUMENTS

| 5,293,452 | A | * | 3/1994 | Picone | ................. G10L 15/142 |
| | | | | | 704/250 |
| 2010/0121636 | A1 | * | 5/2010 | Burke | .................. G06F 3/0346 |
| | | | | | 704/233 |
| 2015/0371665 | A1 | | 12/2015 | Naik et al. | |
| 2016/0148615 | A1 | | 5/2016 | Lee et al. | |
| 2016/0232897 | A1 | * | 8/2016 | Pereira | .................... G10L 15/22 |
| 2016/0358598 | A1 | * | 12/2016 | Williams | ................ G10L 15/04 |
| 2017/0110116 | A1 | * | 4/2017 | Tadpatrikar | ............ G10L 15/05 |
| 2018/0090127 | A1 | * | 3/2018 | Hofer | ...................... G10L 15/04 |
| 2018/0286390 | A1 | * | 10/2018 | Sreedhara | ............ G10L 15/187 |
| 2018/0350395 | A1 | * | 12/2018 | Simko | .................... G10L 25/78 |

FOREIGN PATENT DOCUMENTS

| JP | H 0772899 A | 3/1995 |
| KR | 2001-0018064 A | 3/2001 |
| KR | 10-2016-0064258 A | 6/2016 |

* cited by examiner

*Primary Examiner* — Brian L Albertalli
(74) *Attorney, Agent, or Firm* — Mintz Levin Cohn Ferris Glovsky and Popeo, P.C.; Peter F. Corless

(57) ABSTRACT

A voice end-point detection device, a system and a method are provided. The voice end-point detection system includes a processor that is configured to determine an end-point detection time to detect an end-point of speaking of a user that varies vary for each user and for each domain. The voice end-point detection system is configured to perform voice recognition and a database (DB) is configured to store data for the voice recognition by the processor.

19 Claims, 9 Drawing Sheets

VOICE END-POINT DETECTION DEVICE, SYSTEM AND METHOD

CROSS-REFERENCE TO RELATED APPLICATION

This application is based on and claims the benefit of priority to Korean Patent Application No. 10-2017-0070895, filed on Jun. 7, 2017, in the Korean Intellectual Property Office, the disclosure of which is incorporated herein in its entirety by reference.

BACKGROUND

Field of the Disclosure

The present disclosure relates to a voice end-point detection device, system and method, and more particularly, to technologies for enhancing voice recognition performance by variably applying an end-point detection time upon voice recognition.

Description of the Related Art

Generally, various types of electronic devices, including smartphones or tablet personal computers (PCs), recognize voice signals input using a microphone and determine whether the voice signal is a predetermined keyword. To recognize a voice signal, a conventional electronic device recognizes a voice recognition initiated by the user. After an input signal is continuously received, when a signal includes a silent syllable or a noise is maintained during a constant time (e.g., an end-point detection time, for example, 1 second), the conventional electronic device determines that an input for voice recognition of the user is not received and terminates the reception of a voice signal. Then, specific patterns and the like of the user may be analyzed for data to derive the recognized result.

When an interval for detecting an end-point is determined to be too short, for example, when a portion of the latter part of spoken details of the user is omitted, it is difficult to normally derive a recognized result. When an interval for detecting an end-point is determined to be too long, for example, when a recognition time is increased or due to of noises received in a mute interval where there is no input data, the possibility that misrecognition will occur may be enhanced. Therefore, accurate determination of an end-point detection time for voice recognition is required.

The above information disclosed in this section is merely for enhancement of understanding of the background of the disclosure and therefore it may contain information that does not form the prior art that is already known in this country to a person of ordinary skill in the art.

SUMMARY

The present disclosure provides a voice end-point detection device for enhancing voice recognition performance by variably applying an end-point detection time upon voice recognition, and a system and a method including the voice end-point detection device.

According to an exemplary embodiment of the present disclosure, a voice end-point detection system may include a processor configured to set an end-point detection time for detecting an end-point of a user speaking that varies for each user and for each domain and performing voice recognition and a database (DB) configured to store data for the voice recognition by the processor.

In an exemplary embodiment, the system may further include a display unit configured to display the result of performing the voice recognition by the processor on a screen. The DB may include a voice recognition DB configured to store data for voice recognition and an end-point detection DB configured to store end-point detection information for each user and for each domain.

In other exemplary embodiments, the processor may include an input signal managing unit configured to identity the user and a domain for the speaking and set an end-point detection time for each user or for each domain, a voice detecting unit configured to detect a voice signal spoken by the user by applying the end-point detection time for each user or for each domain, a voice recognition unit configured to perform voice recognition for the detected voice signal, a voice recognition result managing unit configured to output a search result by searching for the result of performing the voice recognition and an end-point detection managing unit configured to maintain or adjust the setting of the end-point detection time based on the search result.

In some exemplary embodiments, the input signal managing unit may identify the user and the domain based upon the user voice and may set a first end-point detection time and a second end-point detection time for each domain. The first end-point detection time and the second end-point detection time may be set per user, which are stored in the DB. The first end-point detection time may be set to be less than the second end-point detection time.

In some exemplary embodiments, the input signal managing unit may include a user identifying unit configured to identify the user who is speaking, a domain identifying unit configured to identify the domain for the spoken voice signal or identify the domain through a domain menu and a multiple end-point detection time setting unit configured to set a per-domain end-point detection time stored for each user, using information regarding the identified user and the identified domain. The voice detecting unit may be configured to detect a first voice signal by applying the first end-point detection time and detect a second voice signal by applying the second end-point detection time.

Further, the voice recognition unit may be configured to output a first voice recognition result by performing voice recognition for the first voice signal and output a second voice recognition result by performing voice recognition for the second voice signal. The voice recognition result managing unit may be configured to output a first search result and a second search result by searching the DB for the first voice recognition result and the second voice recognition result. When there is no search result for each of the first voice recognition result and the second voice recognition result, the end-point detection managing unit may be configured to set the first end-point detection time to be a final end-point detection time.

Additionally, end-point detection managing unit may be configured to compare the first search result with the second search result and may set the first end-point detection time to a final end-point detection time when the first search result is the equal to the second search result. The end-point detection managing unit may be configured to compare the first search result with the second search result and may be configured to receive a selection of one of the first search result and the second search result from the user when the first search result is different from the second search result. When the first search result is selected between the first search result and the second search result, the end-point detection managing unit may be determine the first end-point detection time to be a final end-point detection time. When the second search result is selected between the first search result and the second search result, the end-point detection managing unit may be configured to set the second end-point detection time to be the final end-point detection time.

According to another aspect of the present disclosure, a voice end-point detection device may include an input signal managing unit configured to identify a user and a domain for the user speaking and determine an end-point detection time for each user or for each domain using a per-user or per-domain end-point detection time DB, a voice detecting unit configured to detect each of voice signals spoken by the user by applying a plurality of end-point detection times as determined for each user or for each domain, a voice recognition unit configured to perform voice recognition for each of the detected voice signals, a voice recognition result managing unit configured to output each of search results by searching for each of the results of performing the voice recognition and an end-point detection managing unit configured to maintain or adjust the setting of the end-point detection time based on each of the search results. In addition, the end-point detection managing unit may be configured to compare the search results, maintain the setting of the end-point detection time when the search results are the equal to each other, and adjust the setting of the end-point detection time when the search results are different from each other.

According to another aspect of the present disclosure, a voice end-point detection method may include identifying a user and a domain for the user speaking and setting an end-point detection time for each user or for each domain using a per-user or per-domain end-point detection time DB, detecting each of voice signals spoken by the user by applying a plurality of end-point detection times set for each user or for each domain, performing voice recognition for each of the detected voice signals, outputting each of search results by searching for each of the results of performing the voice recognition, and maintaining or adjusting the setting of the end-point detection time based on each of the search results.

The maintaining or adjusting of the setting of the end-point detection time may include comparing the search results and maintaining the setting of the end-point detection time, when the search results are the same as each other. The maintaining or adjusting of the setting of the end-point detection time may further include comparing the search results and adjusting the setting of the end-point detection time, when the search results are different from each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
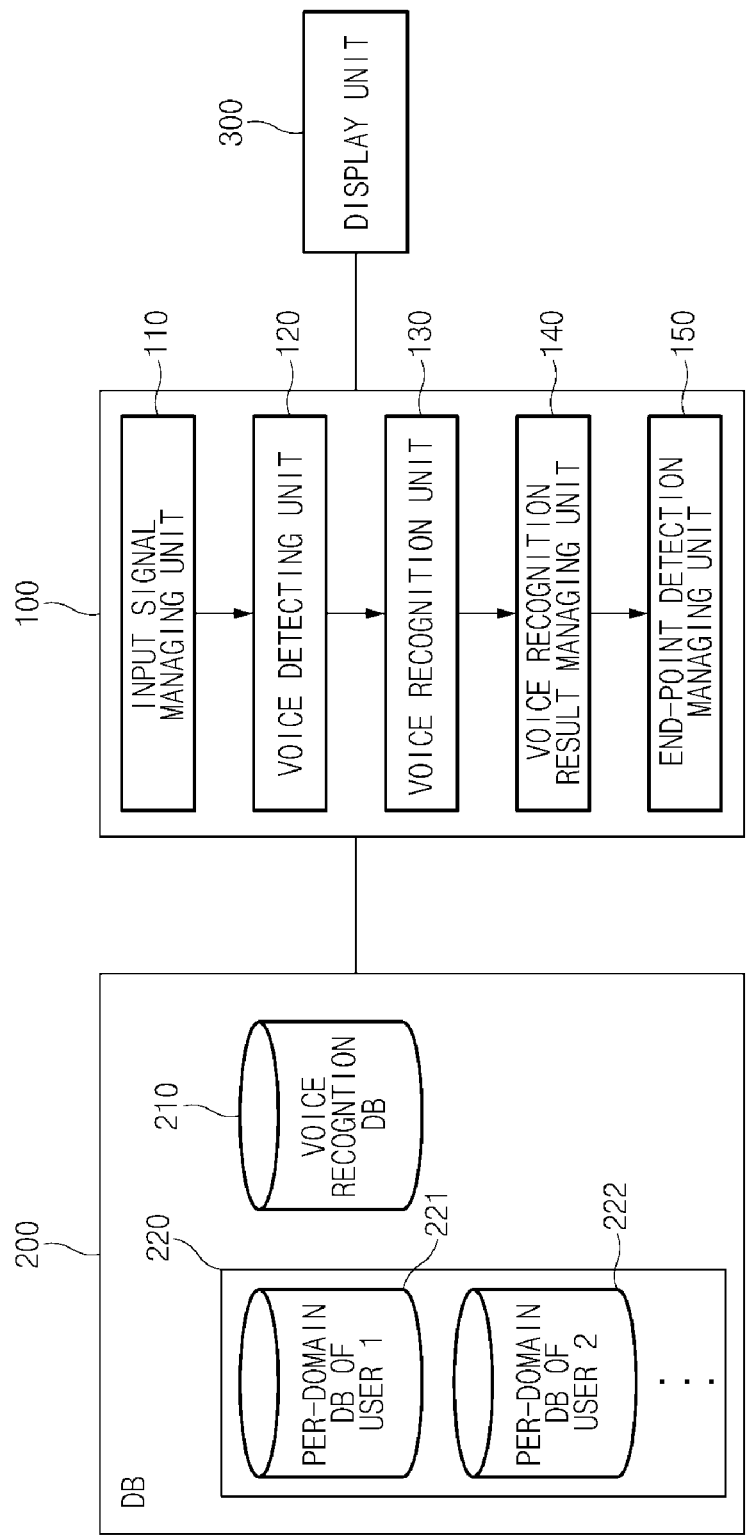
FIG. 1 is an exemplary block diagram illustrating a configuration of a voice end-point detection system according to an exemplary embodiment of the present disclosure.

Hereinafter, exemplary embodiments of the present disclosure will be described in detail with reference to the accompanying drawings. In adding reference denotations to elements of each drawing, although the same elements are displayed on a different drawing, it should be noted that the same elements have the same denotations. In addition, in describing an exemplary embodiment of the present disclosure, if it is determined that a detailed description of related well-known configurations or functions blurs the gist of an embodiment of the present disclosure, it will be omitted.

In describing elements of exemplary embodiments of the present disclosure, the terms 1st, 2nd, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, a description will be given in detail of exemplary embodiments of the present disclosure with reference to FIGS. 1 to 9. FIG. 1 is an exemplary block diagram illustrating a configuration of a voice end-point detection system according to an exemplary embodiment of the present disclosure. The voice end-point detection system according to an exemplary embodiment of the present disclosure may include a processor 100, a database (DB) 200, and a display unit 300. The processor 100 may be configured to set an end-point detection time for detecting an end-point of a user's voice that varies for each user or for each domain and may perform voice recognition, thus maintaining or adjusting the end-point detection time based on the result of performing the voice recognition. In particular, the processor 100 may include an input signal managing unit 110, a voice detecting unit 120, a voice recognition unit 130, a voice recognition result managing unit 140 and an end-point detection managing unit 150.

The input signal managing unit 110 may be configured to identify the user and a domain for the speech and may be configured to determine an end-point detection time for each user or for each domain. In other words, the input signal managing unit 110 may be configured to identify the user and the domain based upon the user's speech and set a first end-point detection time and a second end-point detection time for each domain, the first end-point detection time and the second end-point detection time may be set per user, which are stored in the database 200.

Figure 2:
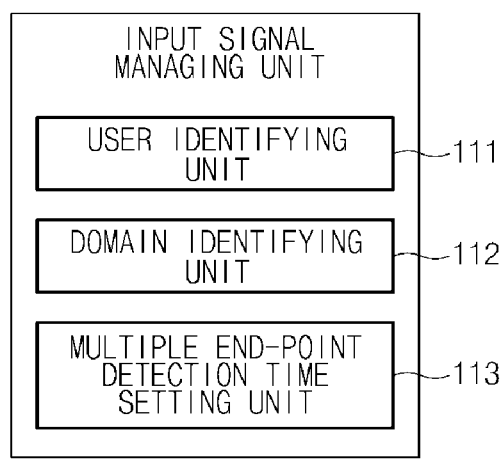
FIG. 2 is an exemplary block diagram illustrating a detailed configuration of an input signal managing unit of FIG. 1 according to an exemplary embodiment of the present disclosure.

FIG. 2 is an exemplary block diagram illustrating a detailed configuration of an input signal managing unit 110 of FIG. 1. Referring to FIG. 2, the input signal managing unit 110 may include a user identifying unit 111, a domain identifying unit 112, a multiple end-point detection time setting unit 113. The user identifying unit 111 may be configured to identify a user who is a speaker. In particular, the identifying of the user may be configured to be performed using voice recognition or pupil recognition.

The domain identifying unit 112 may be configured to identify a domain for a spoken voice signal or identify a domain through a domain menu. For example, in case of voice recognition associated with a point of interest (POI) or when voice recognition is performed where the user accesses a navigation menu, a domain may be determined to be related to the POI. The multiple end-point detection time setting unit 113 may be configured to set a per-domain end-point detection time stored for each user, based on information regarding the identified user and the identified domain. In particular, the multiple end-point detection time setting unit 113 may be configured to apply an end-point detection time as a default setting upon initial speaking.

Figure 3:
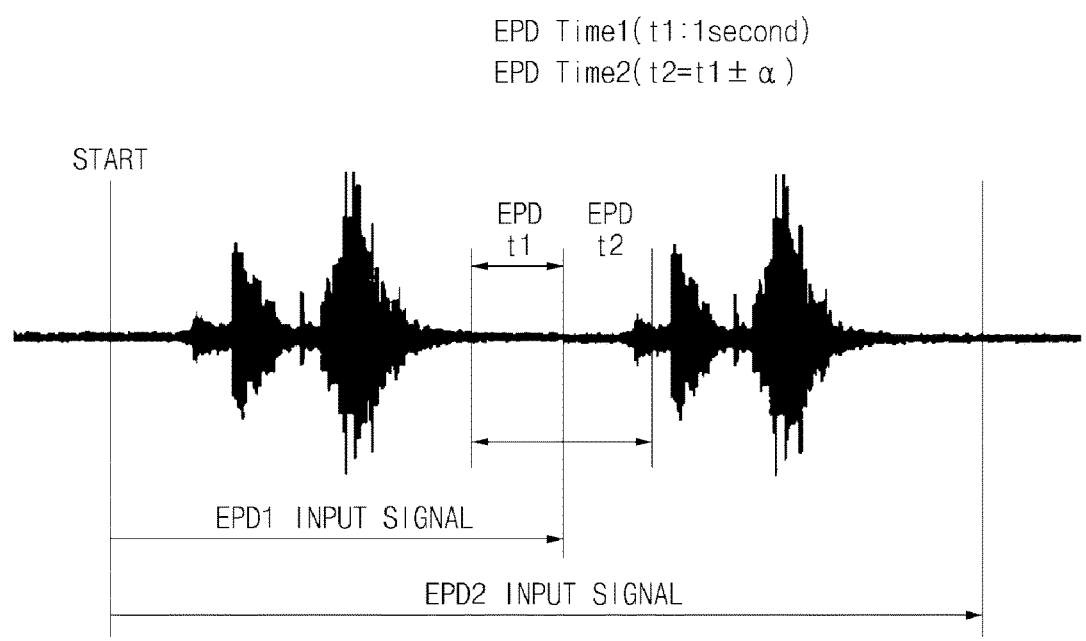
FIG. 3 is an exemplary drawing illustrating an end-point detection time according to an exemplary embodiment of the present disclosure.

A description will be given of an end-point detection time and a domain item with reference to FIG. 3 and Table 1. FIG. 3 is an exemplary drawing illustrating an end-point detection time according to an exemplary embodiment of the present disclosure. Referring to FIG. 3, a first end-point detection time EPD t1 may be configured to be less than a second end-point detection time EPD t2. An exemplary embodiment is exemplified as the two end-point detection times in FIG. 3 and Table 1. However, the number of end-point detection times is not limited to the two end-point detection times. For example, the number of end-point detection times may be set to be two or more end-point detection times.

TABLE 1

| User | | EPD Time1 (Min Time) | EPD Time2 (Max Time) |
|---|---|---|---|
| Default (Global) | General Situation where user may fail to know domain | 1000 ms | 1000 ms ± α |
| Domain 1 (C&C) | Situation where speaking details are short due to simple command in general system | 800 ms | 800 ms ± α |
| Domain 2 (POI, Addr) | Length of sentence is long due to free speaking and the like | 1000 ms | 1000 ms ± α |
| Domain 1 (SMS) | A large amount of speaking is expected due to text transmission and the like | 1300 ms | 1300 ms ± α |

Referring to Table 1, a domain may be classified as a default (global), an internal simple command, POI or address information, a short message service (SMS) message, or the like. The default may be when the user fails to know the domain. In the default, the first end-point detection time EPD Time1 may be determined to be about 1000 ms, and the second end-point detection time EPD Time2 may be set to be about 1000 ms+α. Further, when an internal command, speaking details of which are relatively short, the first end-point detection time EPD Time1 may be set to about 800 ms (e.g., a relatively short duration), and the second end-point detection time EPD Time2 may be set to be about 800 ms+α. Since text details are greater in an SMS, the first end-point detection time EPD Time1 may be set to be about 1300 ms (e.g., a relatively long duration), and the second end-point detection time EPD Time2 may be set to be about 1300 ms+α.

Further, the voice end-point detection system according to an exemplary embodiment of the present disclosure with reference to FIG. 1, may include a voice detecting unit 120 that may be configured to detect a voice signal spoken by a user by applying an end-point detection time for each user or for each domain. In other words, the voice detecting unit 120 may be configured to detect a first voice signal by applying a first end-point detection time and may detect a second voice signal by applying a second end-point detection time. A voice recognition unit 130 may be configured to perform voice recognition for the detected voice signal. In other words, the voice recognition unit 130 may be configured to output a first voice recognition result by performing voice recognition for the first voice signal and output a second voice recognition result by performing voice recognition for the second voice signal.

Figure 4:
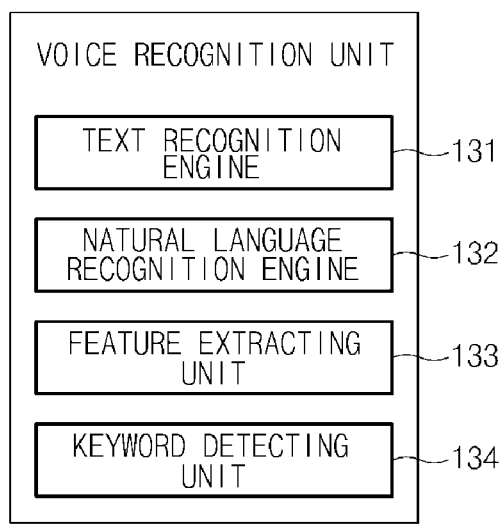
FIG. 4 is an exemplary block diagram illustrating a detailed configuration of a voice recognition unit of FIG. 1 according to an exemplary embodiment of the present disclosure.

FIG. 4 is an exemplary block diagram illustrating a detailed configuration of a voice recognition unit 130 of FIG. 1. Referring to FIG. 4, the voice recognition unit 130 may include a text recognition engine 131, a natural language recognition engine 132, a feature extracting unit 133, and a keyword detecting unit 134. The text recognition engine 131 may be configured to perform text recognition for a first voice signal and a second voice signal, which are input sequentially in a row. The natural language recognition engine 132 may be configured to recognize a natural language. The feature extracting unit 133 may be configured to extract a feature portion for voice recognition. The keyword detecting unit 134 may be configured to detect a keyword or a topic word from the recognized result. In particular, the voice recognition unit 130 may be configured to perform voice recognition using voice recognition technology.

Figure 5:
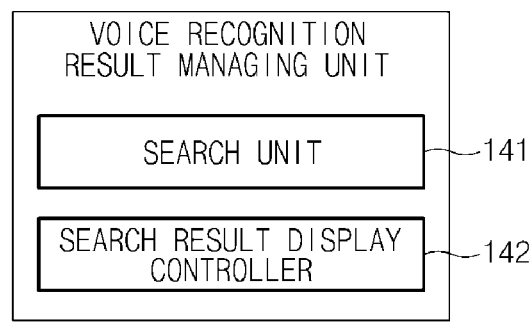
FIG. 5 is an exemplary block diagram illustrating a detailed configuration of a voice recognition result managing unit of FIG. 1 according to an exemplary embodiment of the present disclosure.
Figure 6:
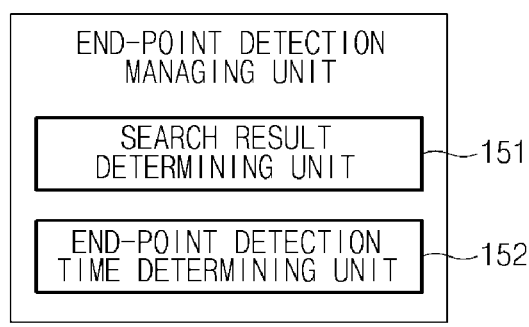
FIG. 6 is an exemplary block diagram illustrating a detailed configuration of an end-point detection managing unit of FIG. 1 according to an exemplary embodiment of the present disclosure.

A voice recognition result managing unit 140 of FIG. 1 may be configured to search a voice recognition DB 210 for a first voice recognition result and a second voice recognition result to output a first search result and a second search result. FIG. 5 is an exemplary block diagram illustrating a detailed configuration of a voice recognition result managing unit 140 of FIG. 1. The voice recognition result managing unit 140 may include a search unit 141 and a search result display controller 142. The search unit 141 may be configured to search a voice recognition DB 210 for a first voice recognition result and a second voice recognition result recognized by a voice recognition unit 130 of FIG. 1. The search result display controller 142 may be configured to display the result found by the search unit 141 on a screen of a display unit 300 of FIG. 1. In particular, the search unit 141 may be configured to search an external server rather than the internal voice recognition DB 210. Further, the search unit 141 may be configured to search for a voice recognition result for each domain based on a POI. In addition, the units may be operated by the controller. The detected result may be configured to be output as one result with high reliability or a plurality of candidate results. An end-point detection managing unit 150 of FIG. 1 may be configured to maintain or adjust a setting of an end-point detection time according to the detected result. FIG. 6 is an exemplary block diagram illustrating a detailed configuration of an end-point detection managing unit 150 of FIG. 1.

Referring to FIG. 6, the end-point detection managing unit 150 may include a search result determining unit 151 and an end-point detection time determining unit 152. The search result determining unit 151 may be configured to compare a first search result with a second search result.

When there is no search result for each of a first voice recognition result and a second voice recognition result, the end-point detection time determining unit 152 may be configured to determine a first end-point detection time to be a final end-point detection time. In particular, since the first end-point detection time may be set to the final end-point detection time based on a default setting, the first end-point detection may be configured to be set to the final end-point detection time and may include the meaning that the first end-point detection time that is maintained as the final end-point detection time.

The end-point detection time determining unit 152 may be configured to compare the first search result with the second search result. When the first search result is identical to the second search result, the end-point detection time determining unit 152 may be configured to set the first end-point detection time to the final end-point detection time. When the first search result is different from the second search result, the end-point detection time determining unit 152 may be configured to receive a selection of one of the first search result and the second search result from a user. When the first search result is selected between the first search result and the second search result, the end-point detection time determining unit 152 may be configured to set the first end-point detection time to be the final end-point detection time. Further, when the second search result is selected between the first search result and the second search result, the end-point detection time determining unit 152 may be configured to set the second end-point detection time to be the final end-point detection time.

A DB 200 of FIG. 1 may be configured to store data for voice recognition by a processor 100 of FIG. 1. For example, the DB 200 may include the voice recognition DB 210 and a per-user and per-domain DB 220. The voice recognition DB 210 may be configured to store data for voice recognition. The voice recognition DB 210 may be the same as a DB for general voice recognition. The per-user and per-domain DB 220 may be configured to store end-point detection time information for each user and for each domain. In other words, the per-user and per-domain DB 220 may include a per-domain DB 221 for a user 1 and a per-domain DB 222 for a user 2. In particular, a user may include at least one or more users.

A display unit 300 of FIG. 1 may be configured to display on a screen a voice recognition result by the processor 100. Particularly, the display unit 300 may be configured to display the first search result and the second search result on the screen to allow the user to select the first search result or the second search result. In other words the present disclosure may be configured to identity a user and a domain for voice speaking and may be configured to determine an end-point detection time for each user or for each domain through a per-user or per-domain end-point detection time DB. The present disclosure may be configured to detect a voice signal spoken by the user based on the set end-point detection time and may be configured to perform voice recognition. Additionally a set of multiple end-point detection times may be maintained or adjusted based on the result of searching for the result of performing the voice recognition. Accordingly, the present disclosure may enhance voice recognition performance by applying a variable end-point detection time as compared with voice recognition to which a fixed end-point detection time is applied.

Figure 7:
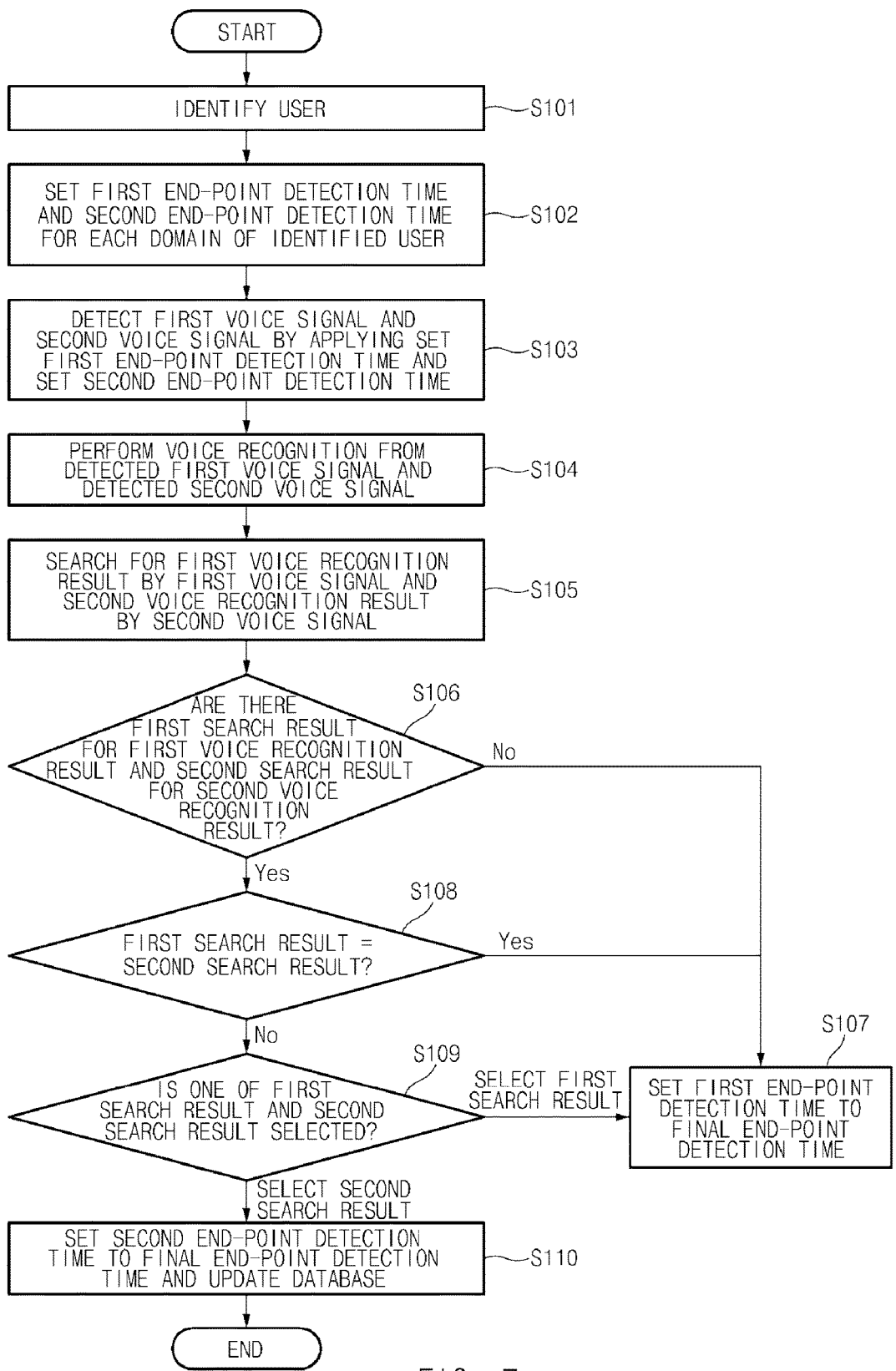
FIG. 7 is an exemplary flowchart illustrating a voice end-point detection method according to an exemplary embodiment of the present disclosure.

Further, a description will be given of a voice end-point detection method according to an exemplary embodiment of the present disclosure with reference to FIG. 7. FIG. 7 is an exemplary flowchart illustrating a voice end-point detection method according to an exemplary embodiment of the present disclosure. A voice end-point detection system may identify a user who is a speaker S101. The voice end-point detection system may be configured to set a first end-point detection time and a second end-point detection time for each domain of the identified user S102. In operation S103, The voice end-point detection system may be configured to detect a first voice signal and a second voice signal by applying the set first end-point detection and the set second end-point detection time S103. Additionally, the voice end-point detection system may be configured to perform voice recognition from the detected first voice signal and the detected second voice signal S104. The voice end-point detection system may be configured to search for a first voice recognition result by the first voice signal and a second voice recognition result by the second voice signal S105. Further, voice end-point detection system may be configured to determine whether there are a first search result for the first voice recognition result and a second search result for the second voice recognition result S106. When there are no the first search result and the second search result, the voice end-point detection system may be configured to determine that the voice recognition is incorrect and may determine the first end-point detection time to be a final end-point detection time to maintain the first end-point detection time S107.

When there is a difference in the detected result, for example, when there is the first search result, but when there is no the second search result, the voice end-point detection system may be configured to apply the first end-point detection time when there is the first search result to the final end-point detection time. For example, when the result recognized by applying the first end-point detection time is "Seoul National University hos in Bundang" and when the result recognized by applying the second end-point detection time is "Seoul National University hospital in Bundang", that is, when "Seoul National University hospital in Bundang" is found from both the results, the voice end-point detection system may be configured to determine the first end-point detection time to be the final end-point detection time to maintain the first end-point detection time.

Furthermore, when there are the first search result and the second search result S108, the voice end-point detection system may be configured to compare the first search result with the second search result. When the first search result is the same as the second search result S107, the voice end-point detection system may be configured to determine that the voice recognition is accurate and set the first end-point detection time to be the final end-point detection time to maintain the first end-point detection time. When the first search result is different from the second search result S109, the voice end-point detection system may be configured to display the first search result and the second search result on a screen and may be configured to receive a selection from a user. When the first search result is selected from the user or when any of the first search result and the second search result is not selected from the user, S107, the voice end-point detection system may be configured to set the first end-point detection time to be the final end-point detection time to maintain the first end-point detection time.

When the second search result is selected from the user S110, the voice end-point detection system may be configured to determine the second end-point detection to be the final end-point detection time and may be configured to update a per-user and per-domain DB 220. For example, when a first search result is "search around Starbucks such as Starbucks in Gangnam" when a first voice recognition result is "Starbucks" and when a second search result is "Starbucks store in Yangjae" when a second voice recognition result is "Starbucks in Yangjae", when the user selects "Starbucks store in Yangjae", the voice end-point detection system may be configured to set the second end-point detection time applied to "Starbucks store in Yangjae" to be the final end-point detection time.

Meanwhile, when a first search result is "search around Starbucks such as Starbucks in Gangnam" when the user speaks "Starbucks store in Yangyeong" and when a second search result is "Starbucks store in Yangjae" when a second voice recognition result is "Starbucks in Yangjae", the user may fail to select both the two search results. Accordingly, when the user does not select both of the first search result and the second search result, the voice end-point detection system may be configured to continue setting the first end-point detection time applied to a conventional final end-point detection time to the final end-point detection time to maintain the first end-point detection time.

The present disclosure may enhance voice recognition availability by classifying start-points and end points of the user's speech for each user and for each domain and actively applying a speaking pattern of the user to more accurately analyze voice recognition and intention. Further, the present disclosure may improve an end-point detection time when an error for the end-point detection set once occurs because of using a fixed end-point detection time.

Figure 8:
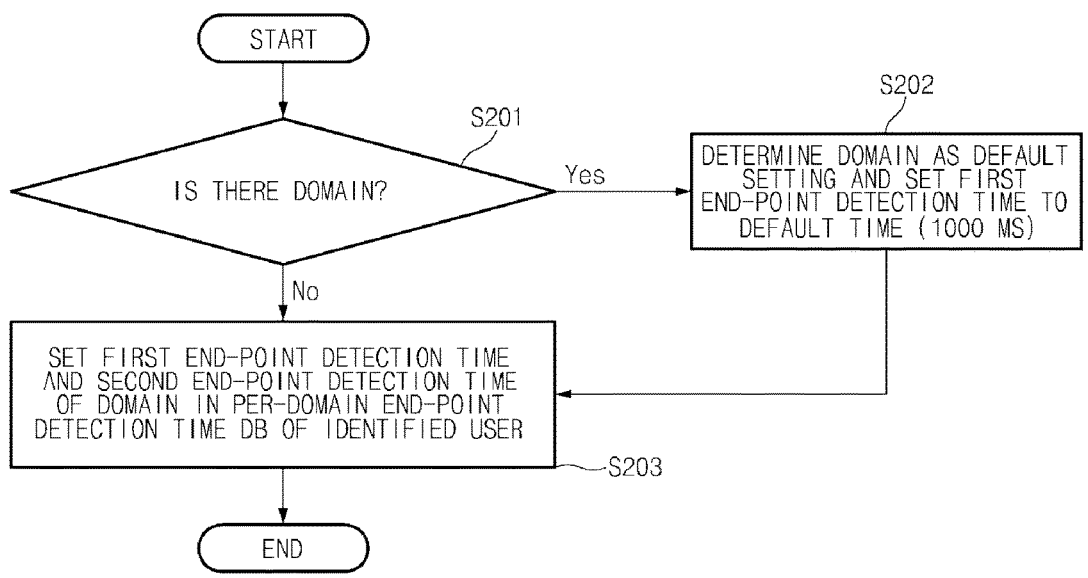
FIG. 8 is an exemplary flowchart illustrating an input signal managing method according to an exemplary embodiment of the present disclosure.

Hereinafter, a description will be given in detail of an input signal managing method according to an exemplary embodiment of the present disclosure with reference to FIG. 8. FIG. 8 is an exemplary flowchart illustrating an input signal managing method according to an exemplary embodiment of the present disclosure. First, when a user's speech is input S201, a voice end-point detection system may be configured to determine whether there is a domain in spoken details. In particular, whether there is the domain may be determined by the speech, a menu selection, or the like of the user.

When there is the domain S202, the voice end-point detection system may be configured to determine the domain as a default setting and may be configured to set a first end-point detection time to a default time (1000 ms) in Table 1. After the domain is determined by applying about 1000 ms upon first speaking to detect a voice signal, when second speaking is input S203, the voice end-point detection system may be configured to set a first end-point detection time and a second end-point detection time through a per-domain DB 220 of an identified user.

In particular, although there is no the domain in operation S201, in operation S203, the voice end-point detection system may be configured to determine the first end-point detection time and the second end-point detection time through the per-domain DB 220 of the identified user. When a silent syllable or a noise is input after a voice signal of the user is input, the present disclosure may increase recognition performance by setting an end-point detection to multiple end-point detection times to obtain different multiple input signals. Additionally, an optimum end-point detection time based on the user for each user and for each domain may be variably applied according to whether there is a search result for the result of performing voice recognition based on the multiple input signals and based on the selection of the user for multiple search results.

Figure 9:
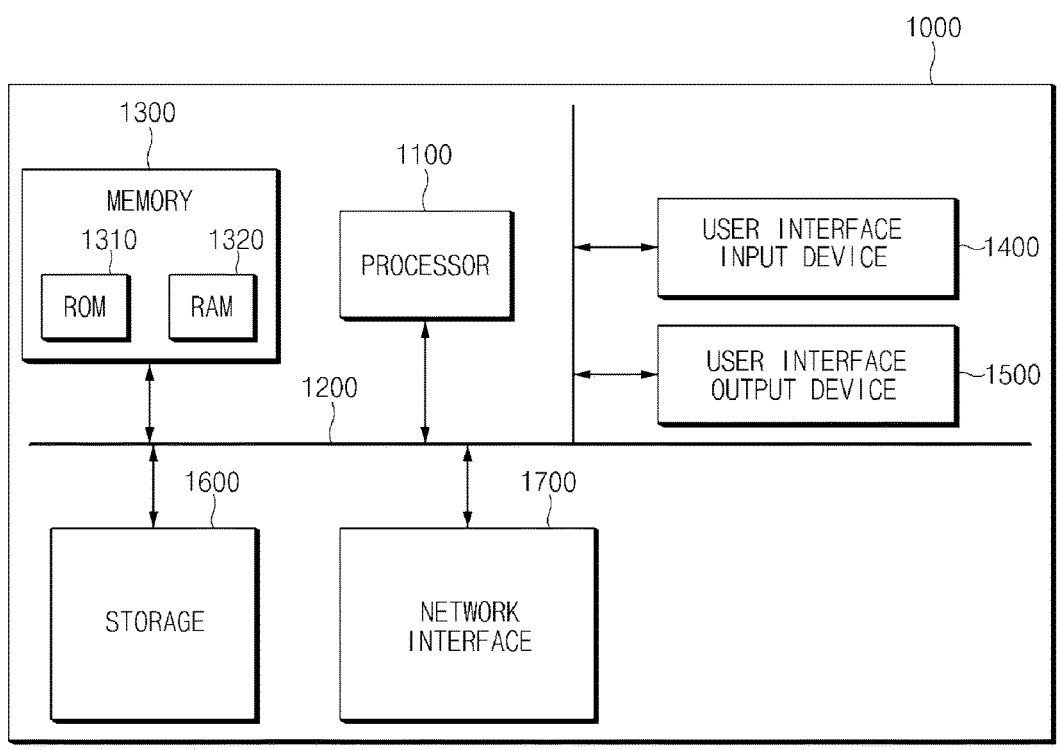
FIG. 9 is an exemplary block diagram illustrating a configuration of a computing system to which a voice end-point detection method is applied, according to an exemplary embodiment of the present disclosure.

FIG. 9 is an exemplary block diagram illustrating a configuration of a computing system having a voice end-point detection method applied. Referring to FIG. 9, a computing system 1000 may include at least one processor 1100, a memory 1300, a user interface input device 1400, a user interface output device 1500, a storage 1600, and a network interface 1700, which are connected with each other via a bus 1200. The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

An exemplary storage medium may be coupled to the processor 1100. The processor 1100 may be configured to retrieve (e.g., read out) information from the storage medium and may be configured to generate (e.g., write) information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal. The electronic device may be configured to enhance voice recognition performance by variably applying the end-point detection time for voice recognition.

While the present disclosure has been described with reference to exemplary embodiments, it will be apparent to those skilled in the art that various changes and modifications may be made without departing from the spirit and scope of the present disclosure. Therefore, exemplary embodiments of the present disclosure are not limiting, but illustrative, and the spirit and scope of the present disclosure is not limited thereto. The spirit and scope and the present disclosure should be interpreted by the following claims.

What is claimed is:

1. A voice end-point detection system, comprising:
a processor configured to set an end-point detection time for detecting an end-point of a voice signal spoken by a user among a plurality of users in a domain among a plurality of domains, the end-point detection time varying for each user and for each domain, and to perform voice recognition to recognize content of the voice signal; and
a database (DB) configured to store data relating to the content of the voice signal recognized by the processor, wherein the processor is configured to identify the user and the domain upon the speaking of the user and determine a first end-point detection time and a second end-point detection time for each domain.

2. The system of claim 1, further comprising:
a display unit configured to display on a screen the result of performing the voice recognition by the processor.

3. The system of claim 1, wherein the DB includes: a voice recognition DB configured to store data for voice recognition; and
an end-point detection DB configured to store end-point detection information for each user and for each domain.

4. The system of claim 2, wherein the processor includes:
an input signal managing unit configured to identify the user and the domain and determine an end-point detection time for each user or for each domain;
a voice detecting unit configured to detect the voice signal spoken by the user by applying the end-point detection time as determined for each user or for each domain;
a voice recognition unit configured to perform voice recognition for the detected voice signal;
a voice recognition result managing unit configured to output a search result by searching for the result of performing the voice recognition; and
an end-point detection managing unit is configured to maintain or adjust the setting of the end-point detection time based on the search result.

5. The system of claim 4, wherein the input signal managing unit is configured to identify the user and the domain upon the speaking of the user and determine a first end-point detection time and a second end-point detection time for each domain, and wherein the first end-point detection time and the second end-point detection time are determined based on the user and are stored in the DB.

6. The system of claim 5, wherein the first end-point detection time is less than the second end-point detection time.

7. The system of claim 6, wherein the input signal managing unit includes:
a user identifying unit configured to identify the user who is a speaker;
a domain identifying unit configured to identify the domain for the spoken voice signal or identify the domain through a domain menu; and
a multiple end-point detection time setting unit configured to determine a per-domain end-point detection time stored for each user based on information regarding the identified user and the identified domain.

8. The system of claim 7, wherein the voice detecting unit is configured to detect a first voice signal by applying the first end-point detection time and configured to detect a second voice signal by applying the second end-point detection time.

9. The system of claim 8, wherein the voice recognition unit is configured to output a first voice recognition result by performing voice recognition for the first voice signal and configured to output a second voice recognition result by performing voice recognition for the second voice signal.

10. The system of claim 9, wherein the voice recognition result managing unit is configured to output a first search result and a second search result by searching the DB for the first voice recognition result and the second voice recognition result.

11. The system of claim 10, wherein when there is no search result for each of the first voice recognition result and the second voice recognition result, the end-point detection managing unit is configured to determine the first end-point detection time to a final end-point detection time.

12. The system of claim 10, wherein the end-point detection managing unit is configured to compare the first search result with the second search result and determine the first end-point detection time to a final end-point detection time when the first search result is the same as the second search result.

13. The system of claim 10, wherein the end-point detection managing unit is configured to compare the first search result with the second search result and configured to receive a selection of one of the first search result and the second search result from the user when the first search result is different from the second search result.

14. The system of claim 13, wherein when the first search result is selected between the first search result and the second search result, the end-point detection managing unit is configured to determine the first end-point detection time to a final end-point detection time, and wherein, when the second search result is selected between the first search result and the second search result, the end-point detection managing unit is configured to determine the second end-point detection time to the final end-point detection time.

15. A voice end-point detection device, comprising:
an input signal managing unit configured to identify a user among a plurality of users and a domain for speech of the user among a plurality of domains and determine an end-point detection time for each user or for each domain using a per-user or per-domain end-point detection time DB;
a voice detecting unit configured to detect voice signals spoken by the user by applying a plurality of end-point detection times for each user or for each domain;
a voice recognition unit configured to perform voice recognition for each of the detected voice signals;
a voice recognition result managing unit configured to search for each of the results of performing the voice recognition and output each of search; and
an end-point detection managing unit configured to maintain or adjust the setting of the end-point detection time based on each of the search results,
wherein the input signal managing unit is configured to identify the user and the domain upon the speaking of the user and determine a first end-point detection time and a second end-point detection tune for each domain, and
wherein the first end-point detection time and the second end-point detection time are determined based on the user and are stored in the DB.

16. The device of claim 15, wherein the end-point detection managing unit is configured to compare the search results, maintain the setting of the end-point detection time when the search results are the same as each other, and adjust the setting of the end-point detection time when the search results are different from each other.

17. A voice end-point detection method, comprising:
identifying, by a processor, a user among a plurality of users and a domain of the user among a plurality of domains and setting an end-point detection time determined for each user or for each domain using a per-user or per-domain end-point detection time DB;
detecting, by the processor, voice signals spoken by the user by applying a plurality of end-point detection times determined for each user or for each domain;
performing, by the processor, voice recognition for each of the detected voice signals;
outputting, by the processor, each of search results by searching for each of the results of performing the voice recognition; and
maintaining or adjusting, by the processor, the setting of the end-point detection time based on each of the search results,
wherein the setting of an end-point detection time determined for each user or for each domain includes:
identifying the user and the domain upon the speaking of the user; and
determining a first end-point detection time and a second end-point detection time for each domain, and
wherein the first end-point detection time and the second end-point detection time are determined based on the user and are stored in the DB.

18. The method of claim 17, wherein the maintaining or adjusting of the setting of the end-point detection time includes: comparing, by the processor, the search results; and
maintaining, by the controller, the setting of the end-point detection time, when the search results are the same as each other.

19. The method of claim 18, wherein the maintaining or adjusting, the setting of the end-point detection time includes:
comparing, by the processor, the search results; and
adjusting, by the processor, the setting of the end-point detection time, when the search results are different from each other.

* * * * *